United States Patent
McLoughlin

(10) Patent No.: US 10,466,721 B2
(45) Date of Patent: Nov. 5, 2019

(54) DISCHARGE VALVE FEATHER CONTROL

(71) Applicant: ROM ACQUISITION CORPORATION, Belton, MO (US)

(72) Inventor: John E. McLoughlin, Hauppauge, NY (US)

(73) Assignee: ROM Acquisition Corporation, Belton, MO (US)

( * ) Notice: Subject to any disclaimer, the term of this patent is extended or adjusted under 35 U.S.C. 154(b) by 29 days.

(21) Appl. No.: 15/276,733

(22) Filed: Sep. 26, 2016

(65) Prior Publication Data

US 2017/0009904 A1   Jan. 12, 2017

Related U.S. Application Data

(63) Continuation-in-part of application No. 14/030,049, filed on Sep. 18, 2013.

(60) Provisional application No. 61/726,659, filed on Nov. 15, 2012.

(51) Int. Cl.
| | |
|---|---|
| G05D 7/06 | (2006.01) |
| F16K 31/04 | (2006.01) |
| A62C 37/42 | (2006.01) |
| A62C 37/40 | (2006.01) |

(52) U.S. Cl.
CPC .......... *G05D 7/0635* (2013.01); *A62C 37/40* (2013.01); *A62C 37/42* (2013.01); *F16K 31/042* (2013.01); *F16K 31/046* (2013.01); *G05D 7/0629* (2013.01)

(58) Field of Classification Search
CPC ......... A62C 37/00; A62C 37/36; A62C 37/38; A62C 37/40; A62C 37/42; G05D 7/0617; G05D 7/0623; G05D 7/0629; G05D 7/0635; F16K 31/042; F16K 31/046
USPC ........................ 251/129.04, 129.13; 700/282
See application file for complete search history.

(56) References Cited

U.S. PATENT DOCUMENTS

| | | | |
|---|---|---|---|
| 2,803,197 A | 8/1957 | Wiley et al. | |
| 2,851,959 A | 9/1958 | Kangas | |
| 3,786,869 A | 1/1974 | McLoughlin | |
| 3,862,739 A | 1/1975 | Fujiwara | |
| 4,189,005 A | 2/1980 | McLoughlin | |
| 4,512,412 A | 4/1985 | Campbell | |
| 4,556,832 A | 12/1985 | Rollins | |
| 4,902,945 A | 2/1990 | Meades et al. | |
| 5,888,051 A | 3/1999 | McLoughlin et al. | |
| 6,285,147 B1 | 9/2001 | Andersson | |
| 6,547,528 B1 | 4/2003 | Yoshida | |
| 6,651,900 B1 | 11/2003 | Yoshida | |
| 6,909,944 B2 | 6/2005 | Pillar et al. | |

(Continued)

*Primary Examiner* — Ian Paquette
(74) *Attorney, Agent, or Firm* — Wei Wei Jeang; Grable Martin Fulton PLLC

(57) ABSTRACT

A control system for controlling a drive motor operating a discharge valve installed in a conduit on a firefighting vehicle. The system includes a pressure sensor configured to measure a pressure of liquids flowing through the conduit, a flow sensor configured to measure a flow rate of liquids flowing through the conduit, a variable control switch operable to generate a variable control signal in response to manual activation, and a microcontroller operable to receive the pressure and flow rate, and generate a variable non-linear control signal operable to cause the drive motor to change the position of the discharge valve at a variable non-linear speed directly proportional to a distance of a current setting from a desired setting.

6 Claims, 2 Drawing Sheets

(56) References Cited

U.S. PATENT DOCUMENTS

| | | |
|---|---|---|
| 7,987,916 B2 | 8/2011 | Laskaris et al. |
| 9,295,862 B2 * | 3/2016 | Cerrano ................. A62C 37/00 |
| 9,399,151 B1 * | 7/2016 | Combs ................... A62C 37/00 |
| 2005/0205132 A1 | 9/2005 | Nagel et al. |
| 2006/0273751 A1 | 12/2006 | DeJonge et al. |
| 2009/0208346 A1 | 8/2009 | McLoughlin et al. |
| 2011/0036508 A1 | 2/2011 | Lin |
| 2011/0064591 A1 | 3/2011 | McLoughlin et al. |
| 2013/0253711 A1 * | 9/2013 | McLoughlin ........... F04B 17/05 700/282 |

* cited by examiner

DISCHARGE VALVE FEATHER CONTROL

RELATED APPLICATION

This patent application is a continuation-in-part application of U.S. Non-Provisional patent application Ser. No. 14/030,049 filed on Sep. 18, 2013, which claims the benefit of U.S. Provisional Patent Application Ser. No. 61/726,659 filed on Nov. 15, 2012.

FIELD

The present disclosure generally relates to a discharge valve variable control for a firefighting vehicle.

BACKGROUND

Firefighting is a highly dangerous occupation that subjects firefighters to many hazards. It is critically important that firefighters have the right amount of water flow (gallons per minute or gpm) when they are combating a fire in various conditions and environments. Determining the water flow rate in a fire hose is an important task for firefighters responsible for operating fire apparatus pumps. Delivering water at the proper flow rate and pressure to firefighters controlling the fire hose nozzles is vital to ensure safe operations. Pressures and flow rates too low will be insufficient for fire control, while pressures and flow rates that are too high creates dangerous conditions with handling the nozzle, burst hose, and other hazards.

Presently there are electric devices for controlling opening and closing discharge valves on a firefighting vehicle, such as a tanker or pumper fire engine. These electric control devices operate at fixed speeds to open or close the valve. When a firefighter desires to make small adjustments of the discharge valve to change the flow rate from 100 gpm to 105 or 110 gpm, for example, it is very easy to overshoot the desired setting, and multiple manipulations of the controls are often required to reach the desired flow rate.

DETAILED DESCRIPTION

Figure 1:
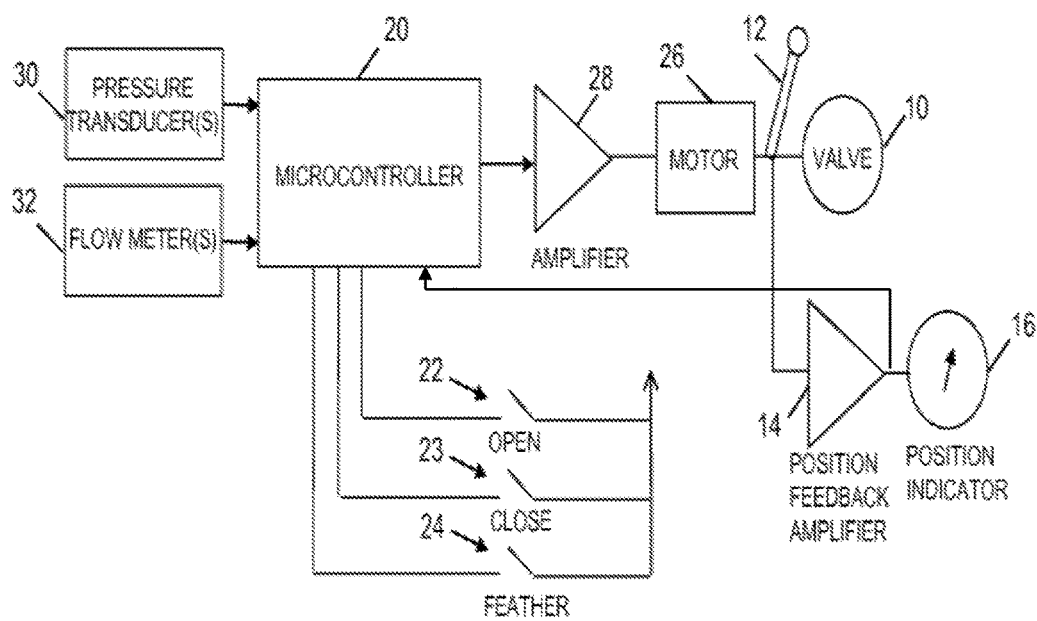
FIG. 1 is a simplified block diagram of an exemplary embodiment of an automatic valve variable control system according to the present disclosure.

FIG. 1 is a simplified block diagram of an exemplary embodiment of an automatic valve variable control system according to the present disclosure. The depicted system is installed on a firefighting vehicle (not shown), such as a pumper or tanker fire engine that carries water in a tank or obtains water from an outside source, such as a fire hydrant, drop tank, swimming pool, or lake. The pumper vehicle includes a discharge valve 10 that is used to control water or other liquids being released through a pipe or hose. A manual lever or handle 12 may be used to manually change the setting of the discharge valve 10. The setting of the discharge valve 10 or manual handle 12 is provided by a position feedback amplifier 14 and displayed by a position indicator 16.

The automatic valve variable control system includes a microprocessor or microcontroller 20 that receives the activation signals of three valve control devices 22-24. Control device 22 and control device 23 are operable to instruct a drive motor 26 to open and close the discharge valve 10, respectively. These control devices 22 and 23 are preferably disposed on a pump panel equipped with many levers, switches, and gauges, including the position indicator 16 of the discharge valve 10. The pump panel is typically a collection of levers and switches that controls how much water is flowing and which lines are being discharged from the pumper/tanker. Typically, activating the open control device 22 causes the discharge valve 10 to open or move toward a wide open position, and activating the close control device 23 causes the discharge valve 10 to close, or move toward a closed shut position. The amount of time the control switches 22 and 23 are activated (pressed) determines the extent the valve is opened or closed.

A third control device 24, is provided as a variable control device. When activated, the variable control device 24 sends a variable control signal to the microprocessor or microcontroller 20. As a result, the microcontroller 20 generates a signal that is operable to slow down the drive motor (electric, pneumatic, or hydraulic) 26 to the discharge valve 10. Accordingly, when the variable control device 24 is activated (e.g., pressed) substantially at the same time or while the open control device 22 or the close control device 23 is activated, the microcontroller 20 instructs the drive motor 26 to operate at a slower predetermined rate, which enables smaller or finer adjustments to the setting of the discharge valve 10 to be made. When the variable control device 24 is deactivated or not pressed while the open or close control device 22 or 23 is not activated, the drive motor 26 runs or operates at the normal predetermined speed. As shown in FIG. 1, an amplifier 28 may be used to amplify the drive motor control signal from the microcontroller 20.

Accordingly, activating the variable control device 24 enables smaller incremental changes to be made in the setting of the discharge valve 10, so that the desired discharge setting can be achieved more easily.

In a second embodiment, activation of the variable control device 24 is operable to slow down the drive motor speed for a predetermined period of time, when the open or close control device 22 or 23 is also activated. As a result, the activation of the open or close control device 22 or 23 during this time period is affected by the variable control signal, resulting in a slower drive motor speed and finer changes to the discharge valve setting. After the predetermined period of time has lapsed, the drive motor speed automatically resumes to the normal speed. This predetermined period of time can be from ½ second to 3 seconds, for example. The predetermined time period of activation for variable control may also be programmable and/or modifiable on-the-fly according to the pump operator's preference, for example. In operation, the variable control device 24 does not need to be continually activated (pressed) while the open or close control device 22 or 23 is activated, which may simplify operations.

Figure 2:
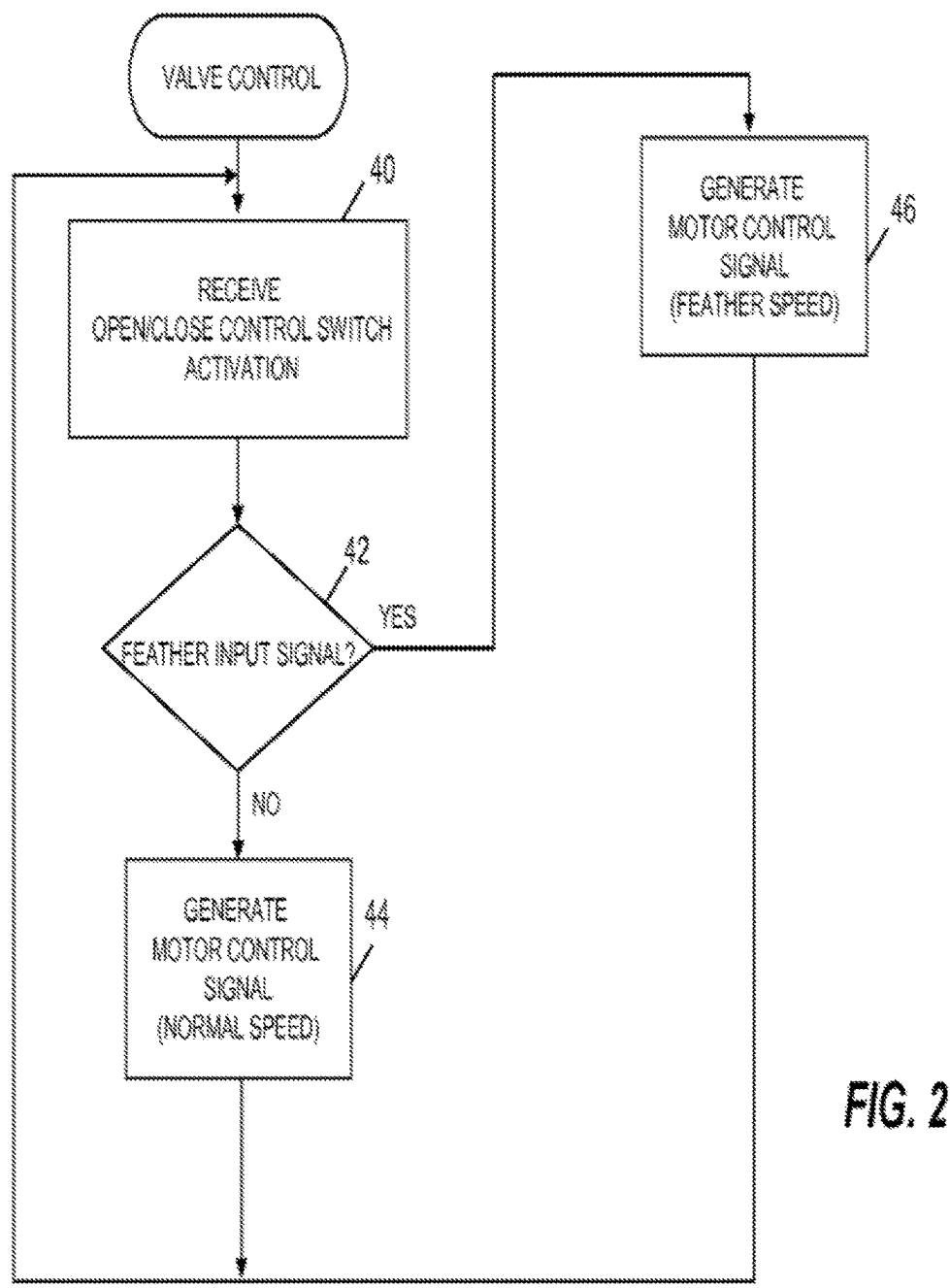
FIG. 2 is a simplified flowchart of an exemplary embodiment of an automatic valve variable control method according to the present disclosure.

FIG. 2 is a simplified flowchart of an exemplary embodiment of an automatic valve variable control method according to the present disclosure. In block 40, the microcontroller 20 receives control signals from the open or close device 22 or 23. The microcontroller 20 determines whether the variable input control device 24 is also activated in block 42. As described above, the variable control device 24 may be activated substantially simultaneously as the open or close control devices 22 or 23, or the variable control device 24 may be activated to initiate a predetermined or programmable variable control time period, in which activating the open and close control devices 22 and 23 is implemented with a slower drive motor speed. If the variable control input signal is not in effect (not activated), then the microcontroller 20 generates a motor control signal that instructs the drive motor to operate at a normal speed to open or close the discharge valve. If, on the other hand, the variable control input signal is in effect (activated), then the microcontroller generates a motor control signal that instructs the drive motor to operate at a variable speed to open or close the discharge valve at a slower rate. The method loops back to block 40 for processing further activations of the control switches.

In further embodiments, the microcontroller 20 further receives sensor inputs from one or more pressure transducers 30 and flow rate meters 32 disposed inline of the fluid flow, such as upstream of the discharge valve 10. Additionally, the microcontroller 20 also receives the position setting of the discharge valve 10. The microcontroller 20 makes calculations that take these input data into account and modulate the valve control signals in response to these sensor data inputs. Generally, the further the discharge valve is to be opened or closed to achieve the desired setting, the larger the amount of incremental change is made to effect faster adjustment. Similarly, the closer the discharge valve is to be opened or closed to achieve the desired setting, the smaller the amount of incremental change is made to effect slower adjustment. In other words, the speed at which the adjustments are made is in proportion to the distance between the current setting from the desired setting. More specifically, the microcontroller 20 receives the position setting of the discharge valve with respect to the desired setting. The microcontroller further receives a discharge valve current flow rate with respect to the desired flow rate, and the current discharge side pressure with respect to the desired pressure. The microcontroller generates a variable non-linear discharge valve control signal that causes the drive motor to change the position/setting of the discharge valve at a variable non-linear speed directly proportional to the distance of the current setting from the desired setting. As the current setting approaches the desired setting, the incremental changes become smaller to effect slower change to the valve setting.

Accordingly, by using the variable control switch 24 the operation of the discharge valve 10 can be more refined to make smaller and more precise adjustments to the setting of the discharge valve 10 when needed.

The drive motor speed can be varied by a number of ways dependent on the type of motor that is used to operate the discharge valve. For an electric motor, pulse width modulation or voltage control techniques may be used. For a pneumatic (air) motor, pressure or flow regulation techniques may be used. For a hydraulic motor, flow regulation techniques may be used. Accordingly, the microcontroller 20 is adapted to generate suitable controls signals to modify the drive motor speed according to the input of the controls switches 22-24.

It should be noted that the word "water" is used herein to generally convey the concept of a fluid used for firefighting purposes, and "water" may include water, foam, chemicals, and other types of fire-suppression fluids.

Further notice should be given regarding the actual implementation of the system in that certain changes and modifications to the described system, though not described explicitly or in detail, are contemplated herein. For example, the microcontroller may be implemented using one or more CPU, or micro-controller circuits. Further, it is understood that a CPU is typically in operation with its attendant circuitry and software, such as memory, interfaces, drivers, etc. as known in the art. Additionally, although not shown explicitly, the system includes memory that may be implemented using one or more data storage devices of a variety of types now known or later developed. Similarly, the system may employ wireless communication that may be achieved using any technology and protocol suitable for the firefighting application. Although wireless communication is the general way information may be conveyed, the communication between the microcontroller and any controlled component and sensor may be achieved by wired and/or wireless means.

The features of the present invention which are believed to be novel are set forth below with particularity in the appended claims. However, modifications, variations, and changes to the exemplary embodiments described above will be apparent to those skilled in the art, and automatic fire pump control system and method described herein thus encompasses such modifications, variations, and changes and are not limited to the specific embodiments described herein.

What is claimed is:

1. A control system for controlling a drive motor operating a discharge valve installed in a conduit on a firefighting vehicle, comprising:
   a pressure sensor configured to measure a pressure of liquids flowing through the conduit;
   a flow sensor configured to measure a flow rate of liquids flowing through the conduit;
   a variable control switch operable to generate a variable control signal in response to manual activation; and
   a microcontroller operable to receive the pressure and flow rate, and generate a variable non-linear control signal operable to cause the drive motor to change the position of the discharge valve at a variable non-linear speed directly proportional to a distance of a current setting from a desired setting.

2. The control system of claim 1, wherein the microcontroller is operable to modulate the speed of the drive motor in response to the pressure and flow rate in addition to the distance of the current setting of the discharge valve from the desired setting.

3. A control system for driving a motor that operates a discharge valve, comprising:
   a variable control switch operable to generate a variable actuation signal in response to manual activation; and
   a microcontroller operable in a variable control mode in response to receiving the variable actuation signal from the variable control switch, and generating an input signal to a drive motor operable to cause the drive motor to change a setting of the discharge valve at a variable non-linear speed in direct proportion to a distance between a current setting and a desired setting of the discharge valve.

4. The control system of claim 3, further comprising:
   a pressure sensor configured to measure a pressure of liquids flowing through the valve;
   a flow sensor configured to measure a flow rate of liquids flowing through the valve; and
   wherein the microcontroller is operable to modulate the speed of the drive motor in response to the pressure and flow rate in addition to the distance of the current setting of the discharge valve from the desired setting.

5. A control method for operating a valve, comprising:
   receiving an activation input;
   generating a variable signal in response to the activation input;

generating and providing a variable non-linear control signal to a drive motor controlling the valve; and running the drive motor to change the setting of the valve at a rate of operation in direct proportion to a distance between a current setting and a desired setting of the valve.

6. The control method of claim 5, further comprising:

receiving a pressure measurement of liquids flowing through the valve;

receiving a measurement of a flow rate of liquids flowing through the valve; and the microcontroller being operable to modulate the speed of the drive motor in response to the pressure and flow rate in addition to the distance of the current setting of the valve from the desired setting.

* * * * *